Figure 1:
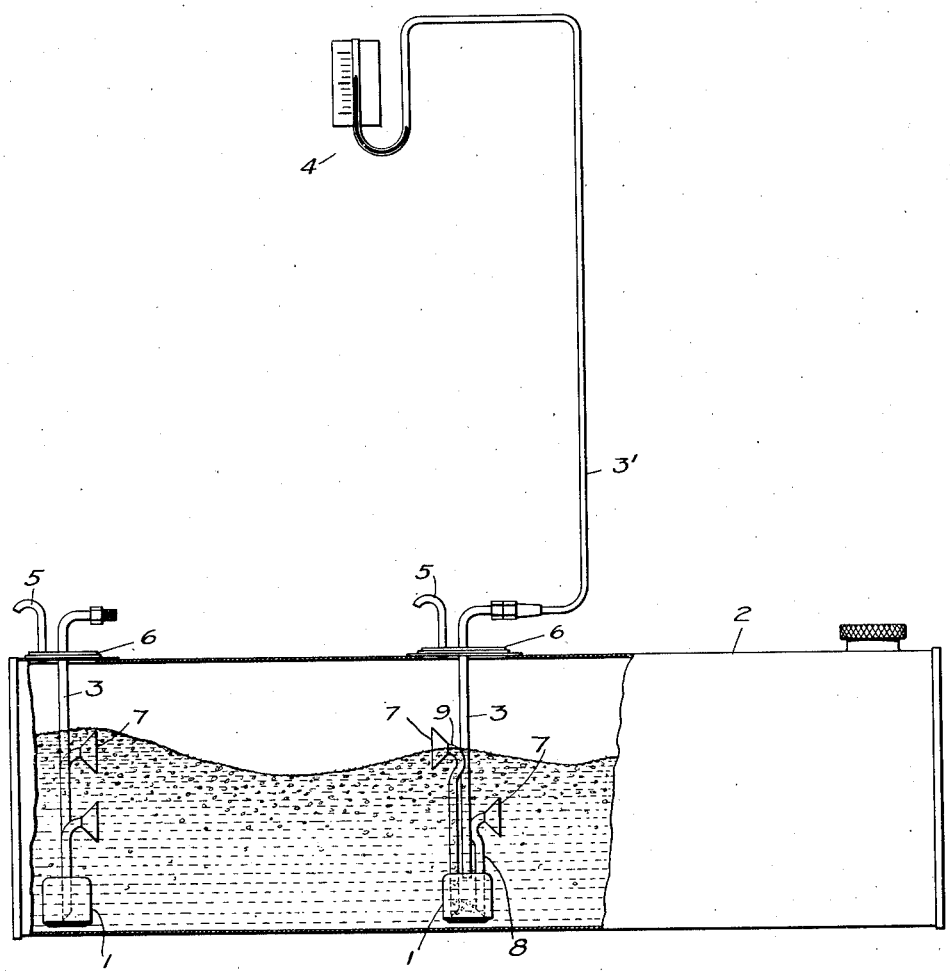

Nov. 6, 1928.

M. E. CHENEY 1,690,215

LIQUID LEVEL GAUGE

Filed Oct. 25, 1927    2 Sheets-Sheet 1

Inventor
Moses E. Cheney
By Attorneys
Nathan & Bowman

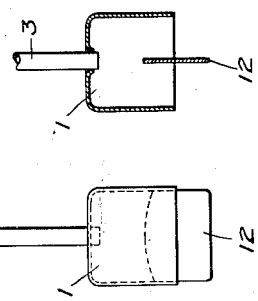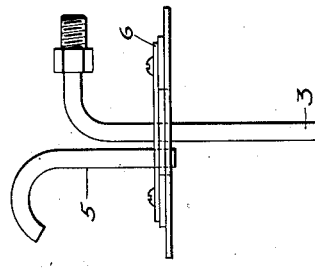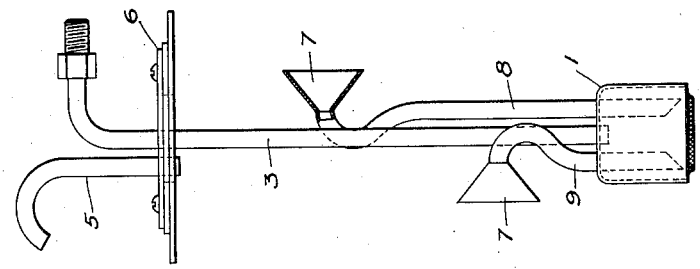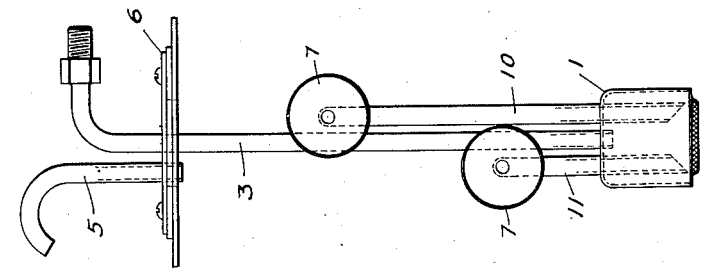

Patented Nov. 6, 1928.

1,690,215

UNITED STATES PATENT OFFICE.

MOSES E. CHENEY, OF LA CROSSE, WISCONSIN, ASSIGNOR TO NATIONAL GAUGE & EQUIPMENT COMPANY, OF LA CROSSE, WISCONSIN, A CORPORATION OF DELAWARE.

LIQUID-LEVEL GAUGE.

Application filed October 25, 1927. Serial No. 228,578.

This invention relates to improvements in liquid level gauges, particularly those adapted to indicate the height, depth or quantity of liquid contained in tanks, and is especially adapted for use in connection with gasoline tanks that are used on the present day motor cars.

The construction is such that the device can be readily inserted into a tank. It has connections with an indicating gauge, preferably shown as a pressure gauge, and the said connection is preferably shown extending from a bell placed near the bottom of the tank. The bell and connecting pipe are secured to a top plate and these parts are termed the fitting; the top plate fitting an opening formed in the top of the tank.

The improvement is designed to take advantage of the surges of the liquid caused by the normal travel of the car over irregular surfaces, changes in direction of its travel and changes in the speed of travel. All these factors cause the liquid to become agitated within the tank and this agitation of liquid causes the liquid near the surface and at a considerable depth therefrom to become aerated and in case of considerable agitation the liquid will be aerated substantially to the full depth thereof. This improvement depends upon the surges of liquid to clear the fitting and, as the surges move in a substantially horizontal direction, there are preferably shown funnel shaped receivers and they are connected to the bell so that the liquid will pass into the funnels, thence downward through the connecting tube of the bell, carrying with it air bubbles that are usually present in the agitated liquid or are trapped in the receiver by reason of the funnel having projected above the liquid.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

In the drawings Figure 1 shows the parts in elevation, the tank being partially broken away; Fig. 2 shows the fitting in elevation, same being adapted to fit into the end of the tank; Fig. 3 shows the device designed for the center of the tank; Fig. 4 is an elevation view of a device having a baffle plate and Fig. 5 is a detail view of same.

There are shown in Fig. 1 two fittings, one in the central part of the tank and one in the end of the tank, but of course one only would be used. In some tanks it will be desirable to use one style of gauge placed centrally in the tank, while in others it will be desirable to use a different style placed in the end of the tank.

The air bell is marked 1 and is placed near the bottom of the tank 2. The pipe line 3' connects with the pressure gauge 4. The air inlet for the tank is 5. Pipe line 3 is secured to the top plate 6, and as the lower end of pipe 3, is secured to the top of the air bell 1, these parts form a single fitting which can be readily inserted within the tanks, the top plate 6 forming a closure for the opening formed in the tank.

The funnels 7 (Figs. 3 and 2) form the upper end of pipes 8, 9, 10 and 11 and there are preferably shown upper and lower funnels, and these funnels are shaped to receive the surge of the liquid in a most advantageous way, in order to insure bubbles of air being carried downwardly to the air bell.

It has been found that even in well baffled tanks the velocity of the splashing gasoline is sufficient with this improved device to clear satisfactorily the fitting and this applies to tanks ¾ full.

The funnels are so positioned as to intercept the liquid as it surges in a horizontal direction and the impelling force of the surge of liquid is such as to force a part of it downward through the tube displacing any liquid that happens to be within the tube, thereby carrying along with it such air bubbles as are ever present in an agitated liquid or are trapped in the connecting pipe by reason of the tube having projected above the liquid.

By reason of the fact that it has been found that at the center of the tank the pressure caused by the velocity of the liquid due to the splash is slightly higher than at other points, the fitting with an upper and lower bell having their faces turned in opposite directions is shown placed at the center of the tank. Consequently, the splurges from two different directions will force the air bubbles down the tubes to the air bell and it has been found that tank fittings will clear faster at that point. Likewise, it is desirable to make the funnels of large diameter to enable the line to be cleared to the greatest advantage. It has also been determined that the device works best if the funnel is placed 1 inch to 1½ inches below the level of the liquid.

In Figs. 4 and 5 are modified constructions wherein a baffle plate 12 projects below the air bell and it has been found that, where there is considerable agitation of the liquid within the tank, this baffle plate will divert upwardly the aerated liquid with the result that the air bubbles will rise to the top of the air bell and clear the line.

It will thus be seen that this improved device, having receiving members such as funnels with surfaces projecting substantially in horizontal directions, is adapted to receive the full impact of the surge of aerated liquid, whereby the liquid will be impelled to the downwardly connecting tube with such force as to cause the aerated liquid to pass downwardly to the air bell when the bubbles of air will pass upwardly to the upper part of the bell. In other words it is a direct acting device since the areated liquid is directed and guided to a point of entry in line with the flow of the liquid and in this respect is to be distinguished from any device depending on differences of pressure caused by differences in level for forcing bubbles of air to the pressure line, and furthermore in this improved device the receiving member need never be above the level of the aerated liquid.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, I claim as new and desire to secure the following combinations and elements, or equivalents thereof, by Letters Patent of United States:—

1. In a tank fitting for liquid level indicators, the combination of an air chamber placed near the bottom of the tank, a conduit extending vertically from and communicating with said chamber, a receiving member at the free end of said conduit, having walls diverging from the center thereof to present an enlarged opening at one end to receive the liquid and a reduced opening at its other end communicating with said conduit the latter having a substantially horizontal passage way for the liquid, and being curved to form an extension of said horizontal passage way and to merge in the vertical portion of said conduit, whereby surges of liquid will be deflected towards the reduced opening causing aerated liquid to enter the extension of the passage and pass downwardly through the conduit to the air chamber.

2. A tank fitting for liquid level indicators comprising an air chamber placed near the bottom of the tank, a plurality of conduits communicating with said chamber and extending vertically therefrom to different heights, a receiving member at the free end of each of said conduits having walls diverging from the center thereof to present an enlarged opening at one end to receive the liquid and a reduced opening at its other end communicating with the respective conduit the latter having a substantially horizontal passage way for the liquid, and being curved to form an extension of said horizontal passage way and to merge in the vertical portion of said conduit, whereby surges of liquid will be deflected towards the reduced opening causing aerated liquid to enter the extension of the passage and pass downwardly through the conduit to the air chamber.

In witness whereof, I have hereunto subscribed my name.

MOSES E. CHENEY.